June 7, 1966  J. A. JOHNSON  3,254,691

LARGE SELF-LOCKING NUT

Filed March 14, 1962

INVENTOR
JOHN ALGOT JOHNSON
BY
Brumbaugh, Free, Graves + Donohue
HIS ATTORNEYS

United States Patent Office 3,254,691
Patented June 7, 1966

3,254,691
LARGE SELF-LOCKING NUT
John Algot Johnson, Short Hills, N.J., assignor, by mesne assignments, to United Shoe Machinery Corporation, Boston, Mass., a corporation of New Jersey
Filed Mar. 14, 1962, Ser. No. 179,724
2 Claims. (Cl. 151—26)

This invention relates to improvements in lock nuts and more particularly to a self-locking nut of large size which can be applied to a complemental threaded member with relatively low torque and can be locked after it is positioned or seated on the threaded member.

Self-locking nuts of the type having a locking collar or insert of vulvanized fiber or resilient material have been made in many sizes up to several feet in diameter and when seated have excellent resistance to loosening by impact or vibration. By the same token, very high torques are required to screw them onto a threaded member. Moreover, during tightening, a very substantial part of the ring or insert is sheared or abraded away for the reason that the ring or insert may travel several feet or more in contact with the male threaded member before becoming fully tightened. The resistance to rotation makes accurate torquing of a nut difficult and the wear on the ring or insert reduces its resistance to loosening.

In accordance with the present invention nuts of the locking insert type are provided in which the nuts can be threaded onto a male threaded member without engagement of the insert with the member and after the nut has been seated or torqued to the desired value, the insert is forced into engagement with the threaded member to resist loosening of the nut.

More particularly, in accordance with the invention, the new nuts have a recess therein which intersects the threaded bore of the nut and receives a locking insert such as a plug or pellet of resilient material, which can be moved along the recess after the nut is seated to engage the threads of the male threaded member and resist relative movement of the nut and the threaded member. In the new nut, the recess is arranged so that the insert is forced against the closed or partially closed inner end of the recess when the nut is loosened and thereby resists strongly the unthreading of the nut. In this way, the new nut may be easily threaded onto a male threaded member and torqued accurately and then retained in position by seating the insert in the bottom of the recess.

For a better understanding of the present invention, reference may be had to the accompanying drawing, in which.

Figure 2:
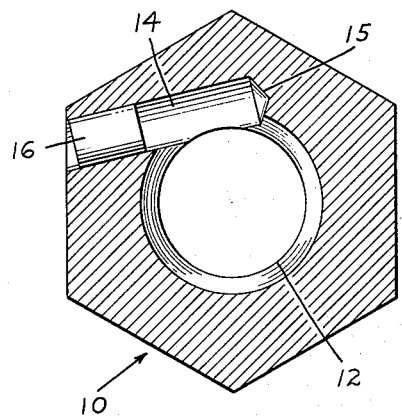
FIGURE 2 is a cross sectional view taken in line 2—2 of FIGURE 1 with a locking element thereof shown in its retracted position.
Figure 1:
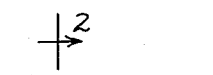
FIGURE 1 is a side elevational view of a self-locking nut embodying the present invention with the unit shown partly in section.

Referring to the drawing, a typical embodiment of the invention is a hex-type nut 10 although the invention is applicable to any other type of nut, threaded collar or the like. The nut 10 has the usual central bore 12 provided with threads 13. A generally cylindrical recess 14 extends from one side of the nut through the body in a direction generally perpendicular and tangent to threaded bore 12. The recess 14 only extends partially through nut 10 and has a closed inner end or bottom 15. A side of threaded bore 12 is intersected by the recess 14.

As shown in FIGURE 2, an insert 16 formed of resilient or elastomeric material such as nylon, is positioned in the recess 14 between the bore 12 and the open end of the recess.

Figure 3:
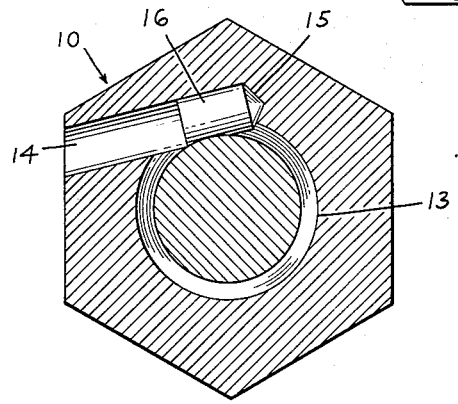
FIGURE 3 is a cross sectional plan of the locking nut mounted on a threaded member with the insert in its advanced and locking position.

In use, the nut 10 is threaded onto a mating threaded member 17, such as a bolt, stud or the like and turns freely until it is in the desired position. At this point a tool such as a punch (not shown) is inserted into the outer end of the recess 14, and insert 16 is driven into recess 14 toward its bottom 15. As insert 16 is moved along the recess 14 it engages the threads on the threaded member 17 and is indented thereby and exerts a strong reactive force which tends to jam the threads of the nut 10 and the member 17 together. FIGURE 3 shows the movable insert 16 in its locking position substantially in engagement with the bottom 15 of the recess 14.

It will be understood that, for insert 16 to effectively lock the nut 10 against backing-off threaded element 17, the recess 14 must be positioned within nut 10 so that, when removal torque is applied to nut 10, the friction between the threaded element 17 and insert 16 will tend to force insert 16 in the direction of bottom 15. This requires that movement of insert 16 within recess 14 toward the bottom 15 be in the same general direction as movement of recess 14 during installation of nut 10 on the threaded element 17. Thus, for a nut 10 having a normal bearing face 42, and having a right hand thread 13, recess 14 will be formed so that the insert 16 moving therein toward bottom 15 will be moving in a generally clockwise direction at the point of tangency of bore 12 when viewed from the face opposite the normal bearing face 42. It is believed apparent, however, that if this nut were installed in the inverted position (i.e., the bearing face 42 facing the direction of movement for removal), the application of removal torque would result in the friction force between threaded element 17 and insert tending to move insert 16 away from bottom 15, thereby reducing the locking effect of the insert.

The locking insert 16 enables even large lock nuts to be mounted on a mating threaded member with relatively low application torque and with no abrasion or wear of the insert. Nevertheless, when the insert is driven into engagement with the threaded member 17, it develops a high resistance to removal of the nut.

The locking torque of the nut can be varied considerably by changing the size of the insert, by selecting insert material of suitable resilience and by varying the number of inserts in the nut and also by varying the radial distance from the nut axis to the center line of the pellet hole.

Figure 4:
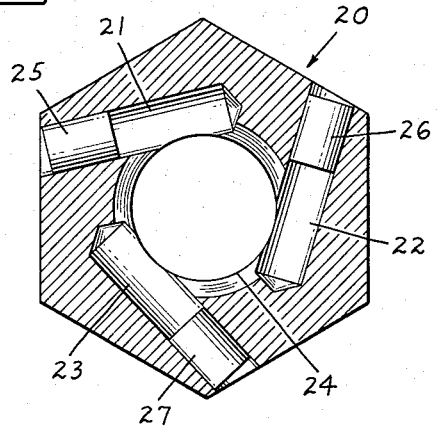
FIGURE 4 is a cross sectional view of a modified form of nut including a plurality of inserts shown in their retracted positions.

As shown in FIGURE 4, the nut 20 may be provided with three recesses 21, 22 and 23 intersecting the threaded bore 24 of the nut, each of the recesses containing an insert 25, 26 and 27 respectively. One or more of these inserts can be driven to the bottoms of the recesses to lock the nut in position. In this way the locking torque can be varied according to requirements and the nut held symmetrically on the center of the male thread. The reusability of the nut can be prolonged by driving in one insert and, when its locking torque decreases, driving another insert in to restore the locking torque.

Figure 5:
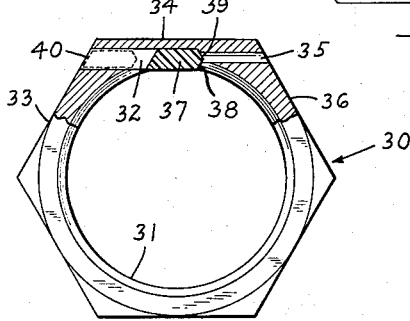
FIGURE 5 is a plan view and partially broken away of another form of nut embodying the present invention.

In some instances, it may be desirable to dislodge the insert from engagement with the member on which the nut is threaded to reduce the torque required to remove the nut. This can be accomplished as shown in FIGURE 5 in which a large ring nut 30, having a threaded bore 31 is provided with a recess 32 extending inwardly from one side 33 of the nut substantially parallel with an adjacent side 34 and intersecting the bore 31 substantially tangentially. A bore 35 of smaller diameter than the recess 32 extends from the side 36 of the nut in alignment with the recess 32 so that a tool can be inserted to dislodge the insert 37 from engagement with the male threaded member and the bottom 38 of the recess 32 to release the nut. As illustrated, the insert 37 may be provided with a pointed leading end 39 which fits the bottom 38 of the recess and thereby, in some instances, provides increased locking torque. Also the outer end 40 of the insert may be mitered as by shearing it flush with the face 33 of the nut, thereby providing increased length which enables it to span fully the gap formed by the intersection of the recess 32 and the bore 31.

Although the invention has been described with reference to typical forms of nuts, it is understood that the embodiments described are illustrative and that numerous changes in details of construction and the combination and arrangement of parts may be resorted to without departing from the spirit and scope of the invention which is hereafter claimed.

I claim:

1. A self-locking threaded fastener comprising a member having a threaded bore for receiving a threaded element, a cylindrical recess in and extending from the exterior transversely of said member and intersecting said bore substantially tangentially, said recess having an open end and a bottom on opposite sides of said threaded bore, and an insert in said recess between said bore and said open end of said recess, said insert being formed of resilient plastic material and having a length less than the distance from the open end of the recess to the point of intersection of the recess and the threaded bore but longer than the distance from the bottom of the recess to the point of intersection, said insert having a transverse dimension at least equal to the diameter of said recess to provide an interference fit therebetween and having a cross-sectional area substantially as great as the cross-sectional area of said recess, said insert being movable lengthwise of said recess into frictional engagement with a threaded element received in said threaded bore and cooperating therewith to frictionally resist removal of the threaded element from said bore, said insert being urged toward said bottom of the recess by the frictional engagement with the threaded element when said threaded member is rotated in a loosening direction.

2. The fastener set forth in claim 1 comprising a passage of smaller diameter than said recess extending from said bottom in substantial alignment with said recess and having an open outer end for receiving a tool to move said insert away from said bottom and towards said open end of said recess.

References Cited by the Examiner

UNITED STATES PATENTS

| 250,448 | 12/1881 | Little | 151—24 |
| 982,502 | 1/1911 | Jacobs | 151—26 |
| 990,106 | 4/1911 | Cassady | 151—26 |
| 1,218,168 | 3/1917 | Cary | 151—26 |
| 2,736,462 | 2/1956 | Manhartsberger | 151—26 |
| 3,039,508 | 6/1962 | Greene | 151—7 |

FOREIGN PATENTS

| 379,934 | 4/1940 | Italy. |

EDWARD C. ALLEN, *Primary Examiner.*